United States Patent
Gray (10) Patent No.: US 7,302,339 B2
(45) Date of Patent: Nov. 27, 2007

(54) HAZARD COUNTERMEASURE SYSTEM AND METHOD FOR VEHICLES

(76) Inventor: Justin Gray, 12003 Walnut Branch Rd., Reston, VA (US) 20194

( * ) Notice: Subject to any disclaimer, the term of this patent is extended or adjusted under 35 U.S.C. 154(b) by 690 days.

(21) Appl. No.: 10/895,067

(22) Filed: Jul. 21, 2004

(65) Prior Publication Data
US 2005/0021224 A1 Jan. 27, 2005

Related U.S. Application Data

(60) Provisional application No. 60/481,115, filed on Jul. 21, 2003.

(51) Int. Cl.
*G01C 21/00* (2006.01)
(52) U.S. Cl. .................. 701/200; 701/36; 701/207; 701/208; 701/29; 340/436; 340/438; 340/439
(58) Field of Classification Search ................ 701/24, 701/29, 34, 36, 200, 207, 208, 300; 340/435, 340/436, 438, 439
See application file for complete search history.

(56) References Cited

U.S. PATENT DOCUMENTS

| 6,108,602 A * | 8/2000 | Bairamis ..................... 701/208 |
| 6,411,894 B2 * | 6/2002 | Yamamoto et al. ......... 701/208 |
| 6,564,147 B2 * | 5/2003 | Chen et al. .................. 701/213 |
| 6,587,573 B1 * | 7/2003 | Stam et al. .................. 382/104 |
| 6,853,913 B2 * | 2/2005 | Cherveny et al. ........... 701/208 |
| 2002/0103622 A1 * | 8/2002 | Burge ......................... 702/183 |

\* cited by examiner

*Primary Examiner*—Gertrude A. Jeanglaude
(74) *Attorney, Agent, or Firm*—Antonelli, Terry, Stout & Kraus, LLP.

(57) ABSTRACT

A control system that activates countermeasures to hazards indicated by a database and by information systems external to the vehicle by activating a plurality of vehicle systems. The control system analyzes location and time information regarding multiple situations that may coincide with the path of the vehicle and controls vehicle systems to provide countermeasures to hazards when probability of encountering those hazards meets a sufficient threshold.

26 Claims, 5 Drawing Sheets

HAZARD COUNTERMEASURE SYSTEM AND METHOD FOR VEHICLES

CROSS REFERENCE TO RELATED APPLICATION

This application claims the benefit of the filing date of Provisional Patent Application Ser. No. 60/481,115, entitled Hazard Countermeasures System for Vehicles, filed on Jul. 21, 2003, which application is incorporated herein by reference in its entirety.

BACKGROUND OF INVENTION

1. Field of the Invention

This invention relates to a vehicle control system and method that employs information available on a data network external to the vehicle, in conjunction with a geographic database and a system for determining the position and velocity of the vehicle to activate countermeasures to long-term and transient hazards that the control system determines the vehicle is likely to encounter.

2. Description of the Prior Art

U.S. Pat. No. 6,587,573 discloses a system and method of automatically controlling vehicle lights on the basis of an image sensor on-board the vehicle. The system does not use an external data network to determine how to control vehicle lights, except to dim them on residential streets. The system has the capacity to respond to external conditions, but not to anticipate events outside sensor range.

U.S. Pat. No. 6,108,602 discloses a control system for a vehicle that uses a position determining system and a database to determine when the vehicle is entering and exiting from tunnels to automatically control climate control and other systems. The system mitigates the risk of known, long-term environmental and visibility hazards in the form of covered roads. U.S. Pat. No. 6,411,894 controls vehicle climate control and other systems in response to the correlation of a vehicle's position and velocity with information stored within a database. Both patents relate to long-term hazards posed by tunnels or otherwise covered roads.

U.S. Pat. No. 6,564,147 discloses a GPS-based control system that triggers events based on the position of a vehicle, including tunnel mode. The system activates controls on the basis of simple boolean logic, does not specify a means of automatically populating a geographical database of hazards and specifies the triggering of actions based upon the entry of a vehicle into a specific location.

Vehicles are increasingly equipped with information systems that are often closely integrated with more conventional systems, including climate control, audio, cruise control, braking, and lighting. The inventions referred to above allow for mitigation of hazards by employing on-board sensors or a static database of long-term hazards. Data networks such as the Internet, cellular telephone networks, proprietary networks such as OnStar, public networks for emergency services, local WiFi networks, and DSRC networks increasingly contain location-specific information regarding long-term and transient hazards potentially endangering the occupants of vehicles. Ideally, a hazard countermeasure system would access a plurality of data sources and types to appropriately activate a plurality of vehicle systems at times more appropriate than on-board sensors could achieve and in situations that could not be detected by on-board sensors to mitigate the risks of both long-term and transient hazards.

SUMMARY OF INVENTION

The invention is a vehicle hazard countermeasure control system capable of mitigating the risk of both long-term and transient hazards. The invention acquires inputs from a vehicle position determining system, a geographic database that holds hazard information, an external data network, and at least one of a plurality of manually or automatically operable switches for controlling vehicle systems to determine when and which countermeasures to activate to mitigate hazard risk by activating at least one of a plurality of vehicle systems that are automatically operable. The invention also communicates with the geographic database and the external data network. The hazard countermeasure controller uses the acquired inputs to make a determination of automatically controlling at least one of the vehicle systems to provide countermeasures for hazards and to return those systems to their original states once the vehicle has overcome a hazard. The invention gathers data used for control by automatically noting the operation of vehicle systems such as door locks, air vents, and other systems that may indicate the presence of vehicle hazards when used with sufficient frequency by vehicles within proximity of a particular location and making that data available via the external data network.

An event such as an armed robbery, a burglary, a carjacking or other similar crime presents a hazard to occupants of a vehicle approaching the proximity of the event. A vehicle multimedia system, a window and sunroof system, a navigation system, an anti-theft system, and a door lock system can be employed to mitigate some risk of such hazards. A plurality of data networks can acquire information about hazards through a plurality of inputs. A vehicle operator or passenger or emergency response person may call a central facility such as a 911 response center or a police station via a cell phone or land phone which may then post information to a vehicle accessible data network. An observer of a hazard may also post information to a data network such as the Internet regarding the hazard via a cell phone or wireless Internet connection. The vehicle control system of the invention may also post information automatically to an external data network through a plurality of means when the vehicle's operator manually operates windows, sunroofs, hazard lights, mobile telephone access to 911, door lock switches, a panic switch or other switches.

A transient condition, such as fog, smoke, dust, precipitation or other suspended particles presents, a hazard to a vehicle approaching and entering it by obscuring obstacles within it. A transient visibility hazard also endangers vehicles within and obscured by it that may be moving at a slower speed than vehicles on the same path behind them. An accident, sudden delays in traffic and other situations may also cause a visibility hazard by diverting vehicle operators' attention. Rapid changes in temperature or humidity may also cause a visibility hazard by causing condensation to form on windows. Low levels of ambient light can also cause a visibility hazard to inattentive vehicle operators. Headlights, running lights, hazard lights, and windshield wipers can be employed to mitigate some risk of such hazards. A plurality of data networks can acquire information about visibility hazards through a plurality of inputs. A vehicle operator or passenger or emergency response person may call a central facility such as a 911 response center or a police station via a cell phone or land phone which may then post information to a vehicle accessible data network. An observer of a visibility hazard may also post information to a data network such as the Internet regarding the hazard via a cell phone or wireless Internet connection. A vehicle control system of the invention may also post information automatically to an external data network through a plurality of means when the vehicle's operator manually operates external lights and hazard light.

A transient condition, such as smoke, dust or other suspended particles, presents a hazard to occupants of a vehicle approaching and entering it by inhalation. A collision between vehicles, a vehicle fire, a damaged hazardous-material-bearing vehicle, a stationary fire or a polluting factory may all release hazardous or unpleasant fumes, particles or gases. Windows, climate control systems, sunroofs, and vehicle vents can be employed to mitigate some risk of such hazards. A plurality of data networks can acquire information about environmental hazards through a plurality of inputs. A vehicle operator or passenger or emergency response person may call a central facility such as a 911 response center or a police station via a cell phone or land phone which may then post information to a vehicle accessible data network. An observer of a environmental hazard may also post information to a data network such as the Internet regarding the hazard via a cell phone or wireless Internet connection. A vehicle control system such as this invention's may also post information automatically to an external data network through a plurality of means when the vehicle's operator manually operates climate control, window, sunroof and other vehicle vent switches.

By supplementing a geographical database storing information regarding long-term hazards such as high crime neighborhoods, polluting factories, and tunnels with new data from an external data network, the invention can automatically activate the appropriate vehicle control systems to provide countermeasures to both long-term and transient hazards when the probability of encountering such hazards exceeds a given threshold.

A control system for a vehicle to provide countermeasures to hazards in accordance with the invention includes a vehicle position determining system; a geographic database of potential hazards; and external data networks; vehicle systems that are manually or automatically controlled; manually or automatic operable switches that activate the vehicles system; and a hazard countermeasure controller comprising a computer and controller program that requires input from the vehicle position determining system, the geographic database of potential hazards, the extended data network in the at least one of the manually or automatically operable switches and communicates with the vehicle systems that are controlled by the control system, the geographic database of potential hazards and the external data network; and wherein the hazard countermeasure controller uses the acquired inputs to make a determination of automatically controlling at least one of the plurality of vehicle systems to provide countermeasures for hazards and to return those systems to their original states once the vehicle has overcome a hazard. The automatic control of at least one of the plurality of vehicle systems may be performed by the hazard countermeasure controller implementing a probability function upon the acquired inputs, which activates the at least one vehicle system when a resulting probability exceeds a threshold indicating the applicability of a hazard countermeasure to overcome a hazard. The acquired inputs may be scaled to affect the result of the probability function. The at least one of the switches may be a manual window switch or may be associated with a local-sensor-initiated hazard countermeasure system, a sunroof switch, a hazard light switch, a mobile telephone system activated by calling 911 or other emergency number, and a panic switch. The controller program uses at least one of the neural network, fuzzy logic, a decision tree, an evolutionary algorithm, and a Bayesian network. The at least one of the vehicle systems may be a window or sunroof control system, a door lock system, a navigation system, a multi-media system, a windshield wiper system, and a external light system. The external data network may be one of TDMA, CDMA and GSM network where the external data network may use one of 802.11a/b, 802.11x, 802.11g and DSRC as a wireless protocol. The external data network may use a wireless data connection to a telecommunication satellite. The external data network may be one of a mesh network, a peer-to-peer network, and a client-server network to communicate with a vehicle-mounted communication device and a stationary device. The position determining system may comprise one of GPS, triangulation, directional antennae, assisted GPS, image recognition, and combinations thereof for detecting the vehicle's position. The system may comprise a velocity determining system; and wherein the countermeasure controller acquires an input from the velocity determining system and uses the input from the velocity determining system to determine the automatic control of the at least one of the plurality of vehicle systems.

In a control system for a vehicle for providing countermeasures to hazards including a vehicle determining system, a geographic database of potential hazards, an external data network, vehicle systems that are manually or automatically controlled, manually or automatically operable switches that activate the vehicle systems and a hazard countermeasure controller comprising a computer and controller program, a method in accordance with the invention includes acquiring inputs from the vehicle position determining system, the geographic database of potential hazards, the external data network and the at least one of the manually or automatically operable switches; communicating with the vehicle systems that are controlled by the control system, the geographic database of potential hazards and the external data network; and the hazard countermeasure controller uses the acquired inputs to make a determination of automatically controlling at least one of the plurality of vehicle systems to provide countermeasures for hazards and to return those systems to their original states once the vehicle has overcome a hazard. The automatic control of at least one of the plurality of vehicle systems may be performed by the hazard countermeasure controller implementing a probability function upon the acquired inputs, which activates the at least one vehicle system when a resulting probability exceeds a threshold indicating the applicability of a hazard countermeasure to overcome a hazard. The acquired inputs may be scaled to affect the result of the probability function. The system may comprise a velocity determining system and the countermeasure controller may comprise an input from the velocity determining system and use the input from the velocity determining system to determine the automatic control of the at least one of the plurality of vehicle systems.

DETAILED DESCRIPTION OF THE INVENTION

The following detailed description of the preferred embodiment of this invention and the attached figures are intended to provide a clear description of the invention without limiting its scope.

Figure 1:
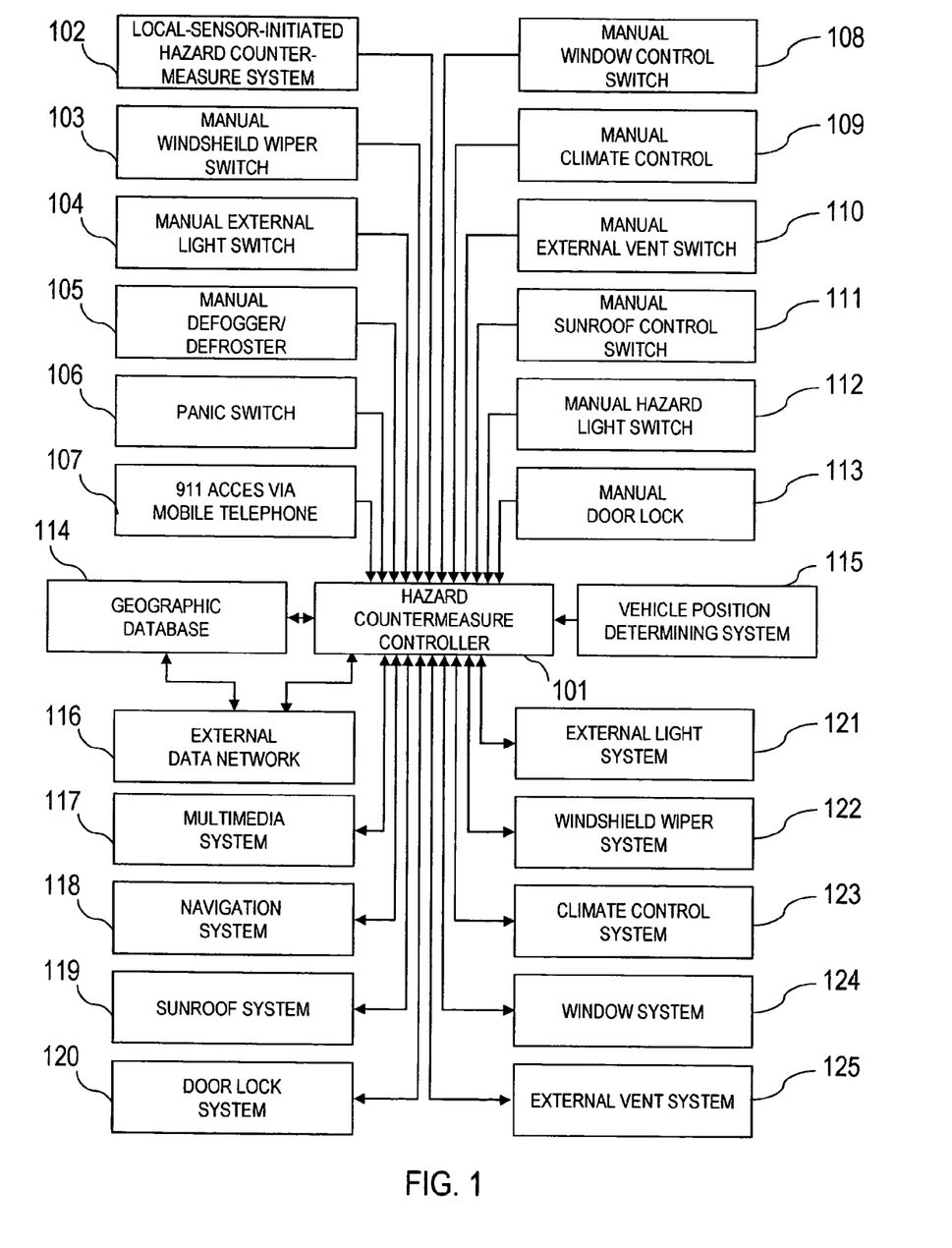
FIG. 1 is a block diagram showing the vehicle hazard countermeasure system and its relationship to conventional vehicle systems.

FIG. 1 is a block diagram that shows the information flow from manually activated switches 103-113 or the local-sensor-initiated hazard countermeasure to the hazard countermeasure controller 101. When an event issues from one of these manually or automatically activated systems, indicating a possible response to a hazard, the position of the vehicle is acquired from the vehicle position determining system 115. This information is then transmitted with a time stamp to the geographic database 114, and to the external data network 116 employing TDMA, CDMA, GSM or other cellular telephone networks, or employing wireless protocols for data transmission such as 802.11a/b, 802.11x, 802.11g, DSRC or other similar digital wireless communication means. Alternatively, the external data network 116 may employ a wireless data connection to a telecommunications satellite. As shorter range communication devices proliferate, the external data network 116 may also take advantage of an architecture of mesh networks, or peer-to-peer networks, or client-server networks or other similar networks of vehicle-mounted communication devices and stationary devices.

Collision hazard data, visibility hazard data or environmental hazard data may also enter the system via a local-sensor-based hazard countermeasure system 102 comprising an adaptive cruise control system, lane change detection system, air pollutant detection system, air bag deployment detection system, anti-theft system or other vehicle system capable of automatically responding to local hazards. Hazard data also enters the system from the external data network 116. When the data is location and time-stamped as relevant to the vehicle's current path, the hazard countermeasure controller 101 may store it within the geographic database 114. The hazard countermeasure controller 101 operates according to its particular embodiment to determine if the probability of the vehicle encountering a hazard has exceeded a given threshold. If so, the hazard countermeasure controller 101 may store the states of vehicle systems 117-125 and send them control signals to enact countermeasures to hazards along the vehicle's probable path. For instance, the manually-initiated closure of multiple vehicles' sunroofs, windows and activation of their windshield wipers and defoggers within a particular region within minutes of a vehicle's arrival may provide sufficient data for the hazard countermeasure controller 101 to activate the vehicle's own similar systems to counter a transient visibility hazard caused by inclement weather.

Figure 2:
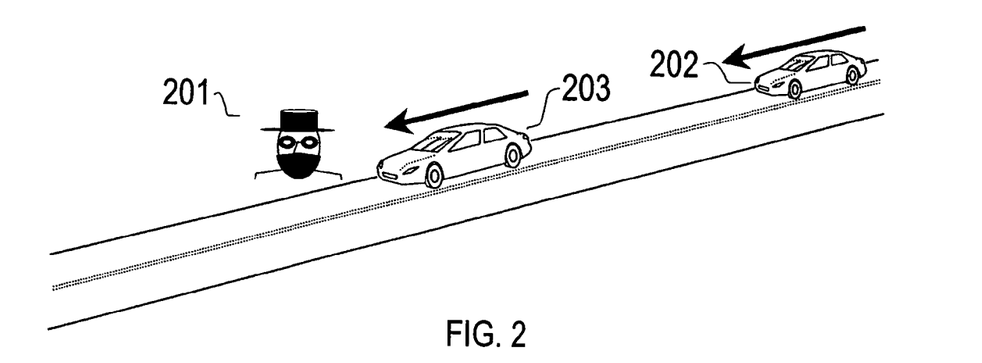
FIG. 2 is a perspective-view illustration of two vehicles approaching a crime hazard.
Figure 3:
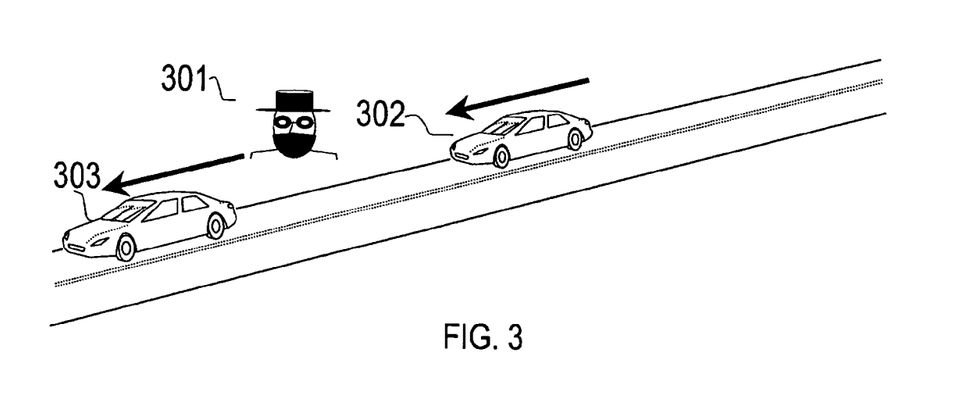
FIG. 3 is a perspective-view illustration of the same two vehicles, road, and crime hazard from FIG. 2 at a later time.
Figure 4:
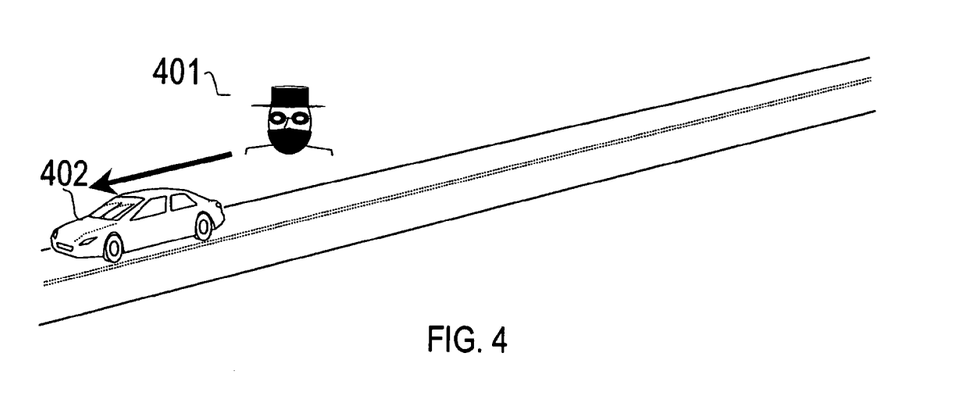
FIG. 4 is a perspective-view illustration of the second of the two vehicles, road, and crime hazard from FIG. 3 at a later time.

FIGS. 2-4 are perspective views representing a sequence of events occurring on a path on which two vehicles are proceeding. The vehicles are travelling approximately along the same course and will both encounter a crime hazard 201. Positions 202, 302, and 402 represent the same vehicle at sequential moments in time. Positions 203 and 303 represent a second vehicle at sequential moments in time. In FIG. 2, the operator of vehicle at position 203 has approached a crime hazard at position 201, which is not yet noted in the geographic database, and determined appropriate vehicle systems to activate to mitigate the risks posed by the hazard. The vehicle operator activates these systems by switches that may include a manual door lock 113, window 108, sunroof 111, panic switch 106, external lights 104 or hazard lights 112. Manual activation of these systems by the operator of vehicle 1 is communicated to the hazard countermeasure controller 101.

In FIG. 3, the vehicle at position 203 has moved beyond crime hazard at position 301 to position 303. The operator of the vehicle may change the state of systems accordingly. Manual changes of these systems by the operator of vehicle at position 303 is communicated to the hazard countermeasure controller 101 from switches that may include a manual door lock 113, window 108, sunroof 111, panic switch 106, external lights 104 or hazard lights 112. When an event issues from one of these manually deactivated systems, indicating a operator-initiated response to the cessation of a crime hazard, the position of the vehicle is acquired from the vehicle position determining system 115. This information is then transmitted with a time stamp to the geographic database 114, and to the external data network 116.

In FIG. 3, the vehicle at position 202 has also moved forward, approaching the crime hazard at position 301. The hazard countermeasure controller 101 of FIG. 1 uses the data from the geographic database 114, which may be augmented by data the controller retrieves from its external data network 116, in combination with information on the vehicle's position acquired from the vehicle position determining system 115 to determine the appropriateness of activating any or all of systems 117-125. The information that the hazard countermeasure controller 101 uses may include events posted to the external data network by the vehicle at position 203 or other vehicles similarly equipped, or events from a plurality of sources, including emergency response centers, emergency personnel, proprietary networks, or resources available via the Internet. This information is received via the external data network 116. If the information obtained from the external data network and geographic database, in combination with the vehicle's position and velocity indicate that there is a high probability that vehicle at position 302 will benefit from the activation of a system 117-125, the hazard countermeasure controller 101 records the state of the systems 117-125 and then emits the appropriate signal to the appropriate system or systems. For instance, the hazard countermeasure controller 101 may direct a navigation system 118 to select and present an alternate route. The hazard countermeasure controller 101 may direct a multimedia system 117 to provide specific audio, graphic or text alerts such as warnings, descriptions or photos. The hazard countermeasure controller 101 may close windows via window system 124 or close a sunroof via sunroof system 119, or lock doors via door lock system 120, or flash or enable external lights or hazard lights via external light system 121. Devices for making this determination comprise neural networks, fuzzy logic, decision trees, evolutionary algorithms, Bayesian networks or other such computational systems that may be implemented in hardware or software form for Turing-complete computational hardware and may be updated via the external data network access system.

In FIG. 4, the vehicle at position 302 has approached the vicinity of the location at which the operator of vehicle at position 303 returned systems to their original states via switches such as manual door lock 113, window 108, sunroof 111, panic switch 106, external lights 104 or hazard lights 112 and posted such changes to an external data network. The hazard countermeasure controller 101 makes use of such information or events posted by other vehicles similarly equipped, or events from a plurality of sources, including emergency response centers, emergency personnel, proprietary networks, or resources available via the Internet in combination with the vehicle's position and velocity to determine the appropriateness of returning the systems 117-125 to their states stored at position 302. The hazard countermeasure controller 101 then transmits the appropriate signals to the appropriate systems 117-125.

Figure 5:
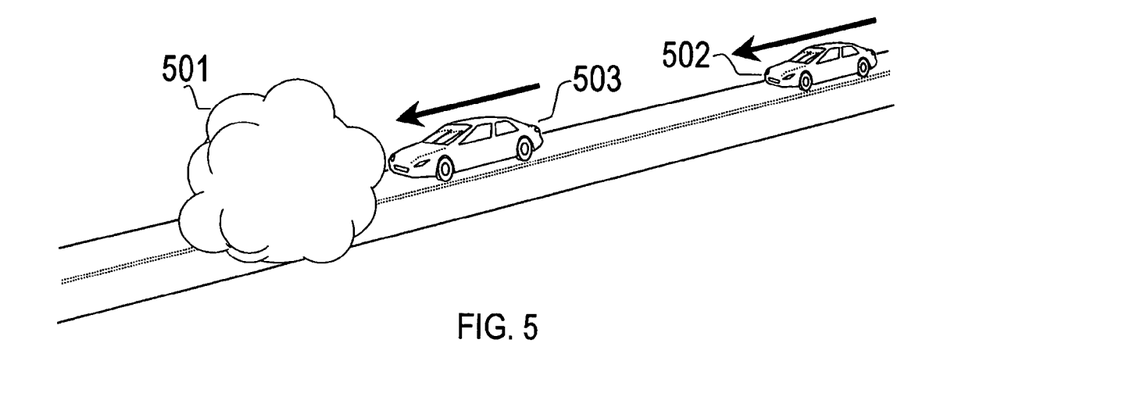
FIG. 5 is a perspective-view illustration of two vehicles approaching a visibility hazard.
Figure 6:
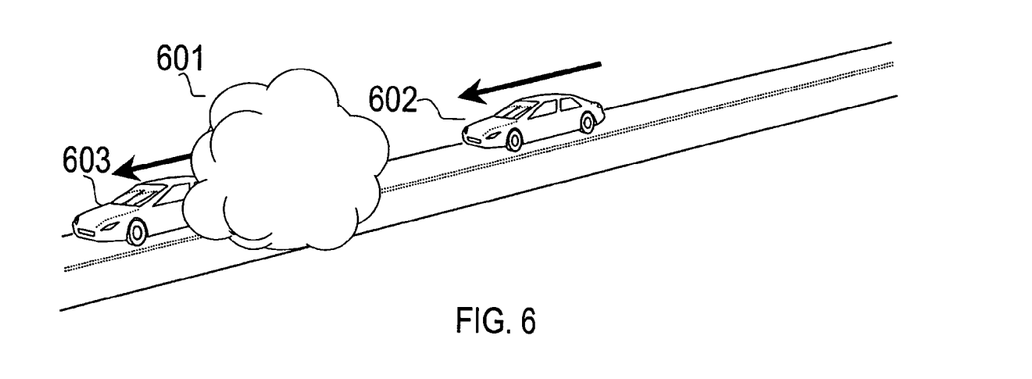
FIG. 6 is a perspective-view illustration of the same two vehicles, road, and visibility hazard from FIG. 5 at a later time.
Figure 7:
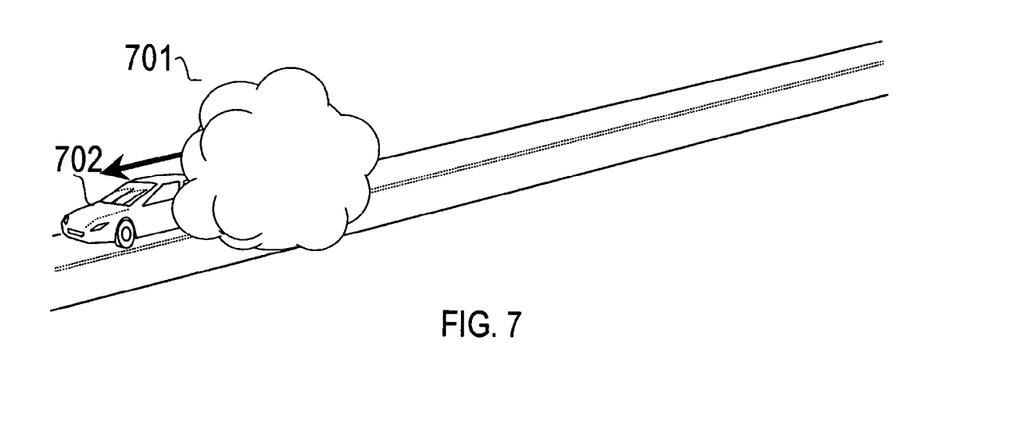
FIG. 7 is a perspective-view illustration of the second of the two vehicles, road, and visibility hazard from FIG. 6 at a later time.

FIGS. 5 through 7 show a sequence of events similar to those in FIGS. 2-4, but with an environmental or visibility hazard represented by cloud 601. Operation of the system is similar to that in the description for FIGS. 2 through 4, with the exception that input from switches and systems 102-113 and output to systems 117-125 is appropriate for visibility or environmental hazards. Inputs for environmental hazards may come from a local-sensor-initiated hazard countermeasure system 102, such as a pollutant detector, or manual switches such as manual windshield wiper switch 103, manual external light switch 104, panic switch 106, 911 access via mobile telephone 107, manual window control switch 108, manual external vent switch 110, manual sunroof control switch 111, or manual hazard lights switch 112. Signals for countermeasures to environmental hazards to prevent risk of inhalation may be sent to systems such as multimedia system 117, navigation system 118, sunroof system 119, window system 124 or external vent system 125. Inputs for visibility hazards may come from a local-sensor-initiated hazard countermeasure system 102, such as an external light detector, or manual switches such as manual windshield wiper switch 103, manual external light switch 104, manual defogger/defroster 105, panic switch 106, 911 access via mobile telephone 107, manual window control switch 108, manual climate control 109, manual external vent switch 110, manual sunroof control switch 111, or manual hazard lights switch 112. Signals for countermeasures to visibility hazards to prevent risk of collision may be sent to systems such as multimedia system 117, navigation system 118, external light system 121, windshield wiper system 122, climate control system 123, window system 124 or external vent system 125. Inputs indicating collision hazards may come from local-sensor-initiated hazard countermeasure systems 102, comprising an adaptive cruise control system, lane change detection system, air pollutant detection system, air bag deployment detection system, anti-theft system or other vehicle system capable of automatically responding to local hazards.

Figure 8:
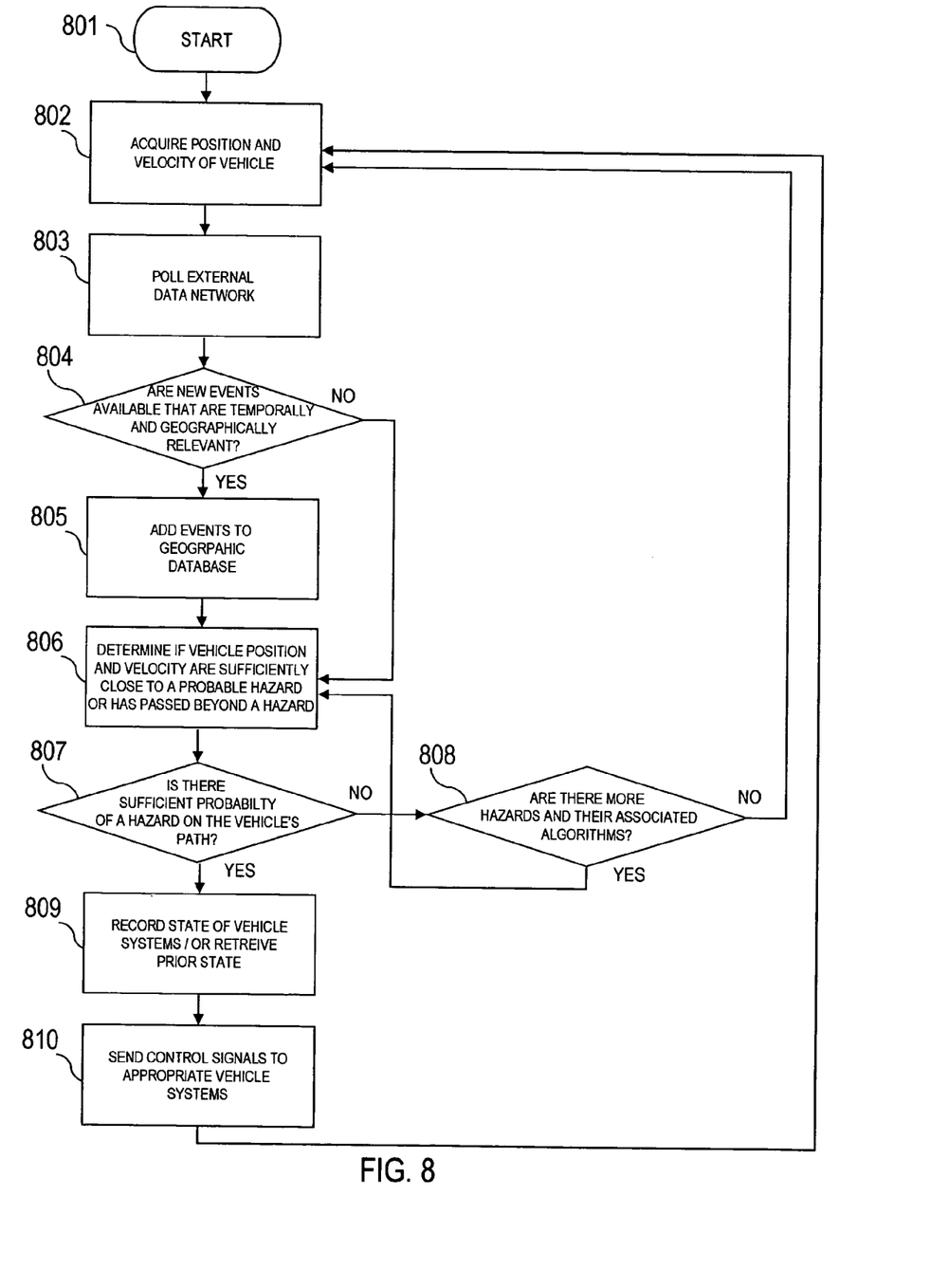
FIG. 8 is a flow chart illustrating the sequence of events in a typical operating session of an embodiment of the vehicle hazard countermeasure system.

FIG. 8 is a flow chart illustrating the sequence of events in a typical operating session of an embodiment of the hazard countermeasure controller 101. This particular embodiment assumes a Von-Neumann architecture microprocessor with short and long term memory stores. After the hazard countermeasure controller 101 execution is initiated in 801, the controller begins to acquire the position and velocity of the vehicle from the position determining system 115. At 803, the hazard countermeasure controller 101 polls the external data network 116 to acquire data regarding hazards which may not be available in the geographic database 114. After making the determination of whether there are new events that are temporally and geographically relevant to the vehicle's position and velocity in 804, execution continues either at 805, where such events are added to the geographic database or otherwise held in addressable memory, or at 806, at which point the hazard countermeasure controller 101 determines if the vehicle's position and velocity are indicative of a path sufficiently likely to encounter a probable hazard. The hazard countermeasure controller 101 may also make the determination at this point that a hazard has been overcome. Execution proceeds to 807, at which a branch is taken based on the determination made in 806. If no hazard has been encountered or overtaken, then execution proceeds to 808, where a check is performed as to whether there are more hazards and their associated algorithms that may be applied to the same set of data that has been acquired through steps 802 through 805. If there are such hazards, then execution returns to 806 and repeats. If all hazards that the hazard countermeasure controller 101 is capable of countering have been explored, then execution resumes at 802 with the acquisition of new position and velocity data. If a hazard probability threshold is exceeded by the calculations of steps 806 and 807, then the state of the vehicle's systems are recorded or retrieved in 809. The controller then sends control signals to the appropriate vehicle systems and commences execution at 802.

Figure 9:
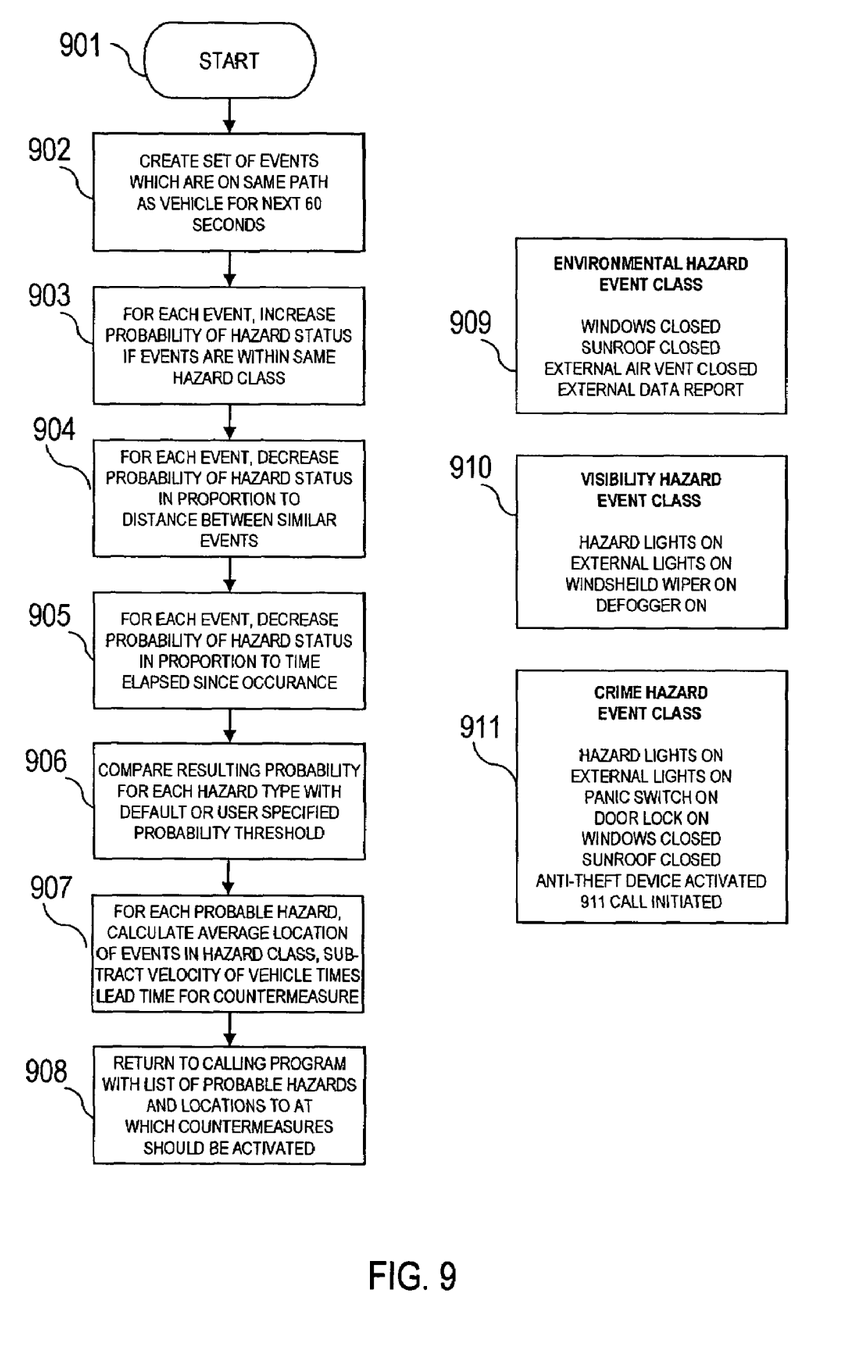
FIG. 9 is a flow chart illustrating the sequence of events in a typical operating session of an embodiment of the hazard countermeasure controller's determination to activate countermeasures to potential hazards and the location at which such countermeasures should be activated.

FIG. 9 is a flow chart illustrating the sequence of events in a typical operating session of an embodiment of the hazard countermeasure controller's determination to activate countermeasures to potential hazards and the location at which such countermeasures should be activated. This particular embodiment assumes a Von-Neumann architecture microprocessor with short and long term memory stores. Decision means for making this determination comprise neural networks, fuzzy logic, decision trees, evolutionary algorithms, Bayesian networks or other such computational systems that may be implemented in hardware or software form for Turing-complete computational hardware and may be updated via the external data network access system. After the program's execution is initiated in 901, it creates a set of events determined to be on the same path as the vehicle during the next sixty seconds or some other set period. This determination is made in 902 based on the vehicle's position and velocity data and the geographically and temporally relevant events passed to the program by the calling hazard countermeasure controller 101. At 903, the program increases its measure of probability of hazard status for each event if the event lies within the same class of hazard such as hazard classes 909-911. An individual weight may also be given to each member of the class. At 904, a similar calculation is made, decreasing the calculated probability of hazard status in proportion to the distance between events of the same class. Thus for distant events, the probability of a single hazard decreases. For a cluster of closely spaced events of the same hazard class, the probability of the events indicating a hazard is calculated to be higher. At 905, the probability of hazard status is decreased in proportion to the time that has elapsed since the event occurred. Thus for a set of events that have taken place contemporaneously but at a time days prior to the vehicle's arrival, the probability of a current hazard is calculated to be low. In step 906, the resulting calculated probability for each hazard type is compared against the system's default threshold, or with a user specified threshold or with a data network provided threshold. In 907 for each probable hazard that has exceeded its class threshold as determined in 906, an average location of relevant events is calculated. The vehicle velocity is multiplied by the required lead time for each countermeasure and subtracted from the average location to calculate a location at which each countermeasure system should be activated. In 908, the program returns to its caller with a list of hazards that have been determined to have higher probability than their respective thresholds and locations at which countermeasures should be activated.

This invention automates the operation of hazard countermeasures for both long-term and transient hazards before vehicle occupants are endangered by such hazards. By using existing information systems and other vehicle systems, the invention can also be implemented via software, significantly reducing the cost of implementation. Because the information indicating hazards can be continuously and automatically updated, the invention also obviates the need for expensive dedicated maintenance of a geographical database of long-term hazards and eliminates the risk of errors introduced into such a database.

While the invention has been described in terms of its preferred embodiments, numerous modifications may be made thereto without departing from the spirit and scope of the present invention. It is intended that all such changes fall within the scope of the appended claims.

The invention claimed is:

1. A control system for a vehicle to provide countermeasures to hazards comprising:
 a vehicle position determining system;
 a geographic database of potential hazards;
 an external data network;
 vehicle systems that are manually or automatically controlled;
 manually or automatically operable switches that activate the vehicle systems; and
 a hazard countermeasure controller comprising a computer and controller program that acquires input from the vehicle position determining system, the geographic database of potential hazards, the external data network and the at least one of the manually or automatically operable switches and communicates with the vehicle systems that are controlled by the control system, the geographic database of potential hazards and the external data network; and wherein
 the hazard countermeasure controller uses the acquired inputs to make a determination of automatically controlling at least one of the plurality of vehicle systems to provide countermeasures for hazards and to return those systems to their original states once the vehicle has overcome a hazard.

2. A system according to claim 1 wherein the automatic control of at least one of the plurality of vehicle systems is performed by the hazard countermeasure controller implementing a probability function upon the acquired inputs, which activates the at least one vehicle system when a resulting probability exceeds a threshold indicating the applicability of a hazard countermeasure to overcome a hazard.

3. A system according to claim 2 wherein the acquired inputs are scaled to affect the result of the probability function.

4. A system according to claim 3 wherein at least one of the switches is a manual window switch.

5. A system according to claim 1 wherein the computer and controller program uses at least one of a neural network, fuzzy logic, a decision tree, an evolutionary algorithm, and a Bayesian network.

6. A system according to claim 1 wherein at least one of the switches is associated with a local-sensor-initiated hazard countermeasure system.

7. A system according to claim 1 wherein at least one of the switches is a sunroof switch.

8. A system according to claim 1 wherein at least one of the switches is a hazard light switch.

9. A system according to claim 1 wherein at least one of the switches is a mobile telephone system activated by calling 911 or other emergency number.

10. A system according to claim 1 wherein at least one of the switches is a panic switch.

11. A system according to claim 1 wherein at least one of the vehicle systems is a window or sunroof control system.

12. A system according to claim 1 wherein at least one of the vehicle systems is a door lock system.

13. A system according to claim 1 wherein at least one of the vehicle systems is a navigation system.

14. A system according to claim 1 wherein at least one of the vehicle systems is a multimedia system.

15. A system according to claim 1 wherein at least one of the vehicle systems is a windshield wiper system.

16. A system according to claim 1 wherein at least one of the vehicle systems is an external light system.

17. A system according to claim 1 wherein the external data network is one of a TDMA, CDMA and GSM network.

18. A system according to claim 1 wherein the external data network uses one of 802.11a/b, 802.11x, 802.11g and DSRC as a wireless protocol.

19. A system according to claim 1 wherein the external data network uses a wireless data connection to a telecommunications satellite.

20. A system according to claim 1 wherein the external data network is one of a mesh network, a peer-to-peer network, and a client-server network to communicate with a vehicle-mounted communication device and a stationary device.

21. A system according to claim 1 wherein the position determining system comprises one of GPS, triangulation, directional antennae, assisted GPS, image recognition, and combinations thereof for detecting the vehicle's position.

22. A system in accordance with claim 1 comprising a velocity determining system; and wherein the countermeasure controller acquires an input from the velocity determining system and uses the input from the velocity determining system to determine the automatic control of the at least one of the plurality of vehicle systems.

23. In a control system for a vehicle for providing countermeasures to hazards including a vehicle position determining system, a geographic database of potential hazards, an external data network, vehicle systems that are manually or automatically controlled, manually or automatically operable switches that activate the vehicle systems, and a hazard countermeasure controller comprising a computer and controller program, a method comprising:
 acquiring inputs from the vehicle position determining system, the geographic database of potential hazards, the external data network and the at least one of the manually or automatically operable switches; and
 communicating with the vehicle systems that are controlled by the control system, the geographic database of potential hazards and the external data network; and the hazard countermeasure controller uses the acquired inputs to make a determination of automatically controlling at least one of the plurality of vehicle systems to provide countermeasures for hazards and to return those systems to their original states once the vehicle has overcome a hazard.

24. A method according to claim 23 wherein the automatic control of at least one of the plurality of vehicle systems is performed by the hazard countermeasure controller implementing a probability function upon the acquired inputs, which activates the at least one vehicle system when a resulting probability exceeds a threshold indicating the applicability of a hazard countermeasure to overcome a hazard.

25. A method according to claim 24 wherein the acquired inputs are scaled to affect the result of the probability function.

26. A method according to claim 23 wherein the system comprises a velocity determining system; and wherein the countermeasures controller acquires an input from the velocity determining system and uses the input from the velocity determining system to determine the automatic control of the at least one of the plurality of vehicle systems.

* * * * *